July 26, 1927.

L. C. HUCK 1,636,819

FINAL DRIVE FOR MOTOR TRUCKS

Filed Oct. 18, 1919    2 Sheets-Sheet 1

WITNESS:

INVENTOR.
Louis C. Huck
BY
ATTORNEYS

July 26, 1927.

L. C. HUCK 1,636,819

FINAL DRIVE FOR MOTOR TRUCKS

Filed Oct. 18, 1919     2 Sheets-Sheet 2

WITNESS:

INVENTOR.
Louis C. Huck
BY
Munn & Co.
ATTORNEYS

Patented July 26, 1927.

1,636,819

UNITED STATES PATENT OFFICE.

LOUIS C. HUCK, OF CHICAGO, ILLINOIS, ASSIGNOR TO HUCK AXLE CORPORATION, OF CHICAGO, ILLINOIS, A CORPORATION OF ILLINOIS.

FINAL DRIVE FOR MOTOR TRUCKS.

Application filed October 18, 1919. Serial No. 331,713.

My invention relates to improvements in final drive for motor trucks, and it consists in the combinations, constructions and arrangements herein described and claimed.

An object of my invention is to combine the advantageous features of the worm drive, such as grouping the entire final drive in one unit, which is removable as a unit, with the well known advantages of the high efficiency of spur gear drives, thereby eliminating the undesirable low efficiency, especially at low speeds to which worm gearing is subject.

It is also my object to improve on that form of internal gear drive, in which a pinion transmits its motion to an internal ring gear through idler gears whose centers of rotation are held stationary, the internal ring gear rotating and being rigidly fastened to the wheel.

Another object of the invention is to provide greater road clearance than possible with some other types of final drive, thus permitting the vehicle to be used on roads where obstacles such as rocks, stumps, deep ruts and sand might otherwise cause interference.

A further object of my invention is to provide a final drive assembly which permits the utilization of a smaller differential than can be used in types having both reductions ahead of the differential.

A further object of my invention is to have the complete final reduction in one unit, which is removable as a unit from the axle housing. This facilitates replacing damaged parts, and also allows all adjustments to be made before the assembly is bolted in the axle housing.

A further object of my invention is to provide a device of the kind described, in which a larger spur driving pinion may be used to obtain a given gear reduction with a given sized ring gear.

A further object is to provide a construction which, for a given sized internal ring gear and a given reduction, will deliver a given torque at the wheels with less tooth pressure.

A further object is to provide a construction in which the gears and other moving parts may be run in a bath oil.

Other objects and advantages will appear in the following specification, and the novel features of the invention will be particularly pointed out in the appended claims.

Figure 1:
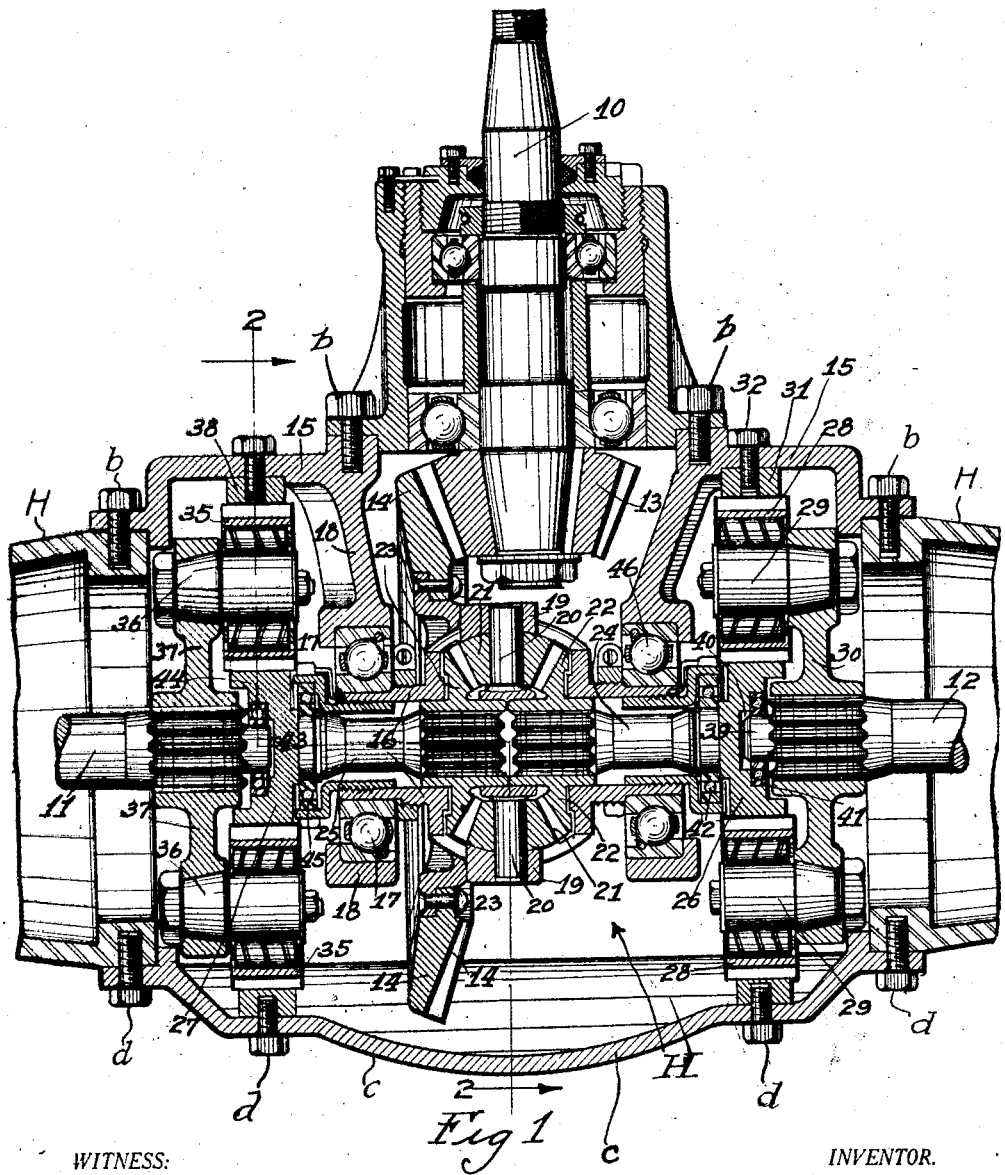
Figure 2:
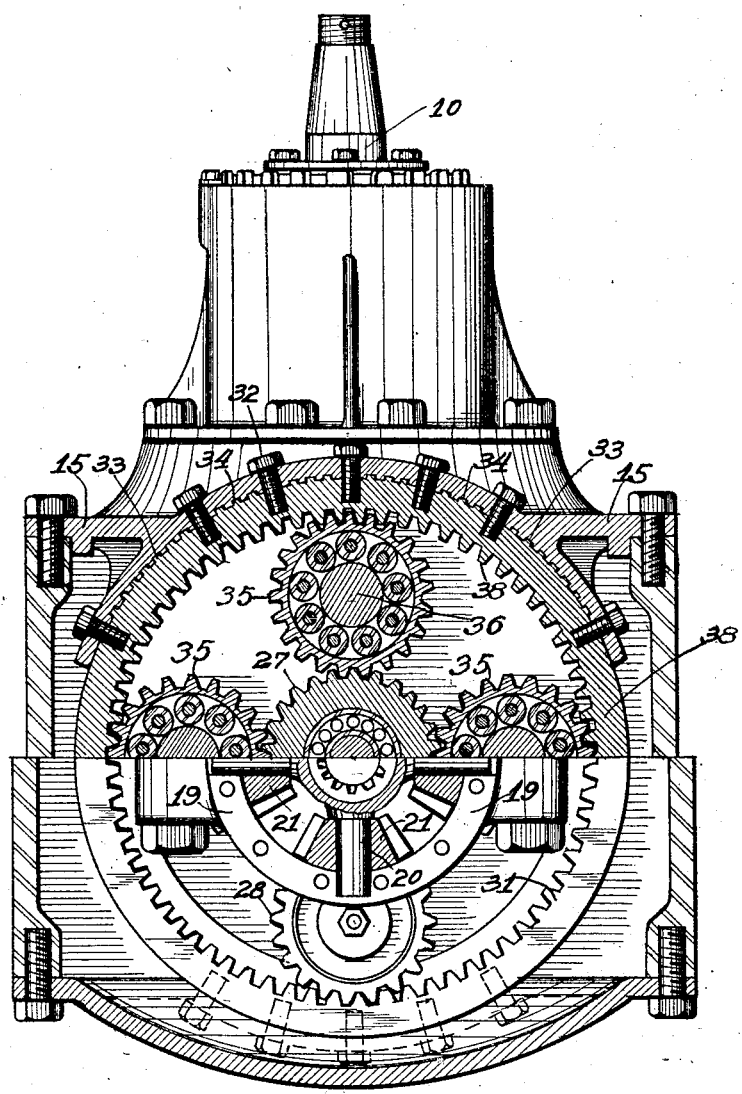

My invention is illustrated in the accompanying drawings, forming part of this application, in which Figure 1 is a central section through the final drive assembly, and Figure 2 is a section along the line 2—2 of Figure 1.

Referring to Figure 1, the drive shaft is indicated at 10, and the axle shafts at 11 and 12 respectively, the latter being of substantially equal length, and positioned within a housing H which at its central portion is enlarged to receive the driving mechanism carrier frame hereinafter referred to. The rear end of the drive shaft 10 is provided with a bevel pinion 13, engaging a bevel gear 14 carried by the driving mechanism carrier frame, which projects into the housing H, and is removably secured thereto by means of bolts, or the like $b$. The housing H is provided on its opposite side with the plate $c$, which is removably secured to the housing by bolts $d$, or other suitable fastening means 15. The gear 14 has a hub portion 16 which is mounted to turn in bearings 17, carried by a bracket 18 which forms part of the carrier frame 15. An extension 19 bears stub shafts 20 of a differential spider, upon which are mounted idlers 21 of the differential. These idlers are arranged to engage bevel gears 22 and 23 splined on the ends of stub axles 24 and 25 respectively. The latter bear at their outer ends driving pinions 26 and 27 respectively. The pinion 26 is in mesh with idlers 28 which are carried by studs 29 mounted on a driving ring 30 which is splined at the inner end of the axle shaft 12. The idlers 28 engage an internal ring gear 31 which is secured to the carrier frame 15 by means of bolts 32. The outer side of the ring gear 31 is provided with a series of tongues 33 (see Figure 2), arranged to enter corresponding grooves 34 in the carrier frame 15, so as to prevent a rotary movement of the ring gear.

The construction on the opposite side is similar: that is to say, the pinion 27 engages idlers 35 on studs 36 carried by a driving ring 37 secured to the end of the axle shaft 11. The idlers 35 are in engagement with a ring gear 38, which is similar in construction to the ring gear 31.

It will be noted that the axle shaft 12 has an extension 39 which enters a recess 40 in the gear 26, pilot bearings 41 being provided. Pilot bearings 42 are also provided for the stub axle 24. The bearings 41 and 42 are termed pilot bearings, as they carry no driving forces, and are used merely as anti-friction supports to hold the rotating parts in alinement against their own weight. It is one object of my invention to balance driving forces on both pinion and ring gear, so that they will neutralize one another. On the opposite side an extension 43 is provided with bearings 44, while bearings 45 are provided for the stub shaft 25. The arrangement set forth provides a planetary gearing, in which the gears within the carrier frame 15, with the exception of the gear 13, are mounted concentrically about a common axis. Bearings 46, which are similar to the bearings 17, are provided as shown in Figure 1.

From the foregoing description of the various parts of the device, the operation thereof may be readily understood. The gear 14 is driven through the medium of the drive shaft 10 and the pinion 13, and by means of the differential the stub shafts 24 and 25 are driven, thus driving the pinions 26 and 27, and through them the idlers 28 and 35. These travel around the stationary ring gears 31 and 38 in planetary rotation, thus turning the axle shafts 11 and 12 through the medium of the driving rings 37 and 30 respectively. The provision of the bearings 41 and 44 insures the centering or axial alinement of the members which constitute the planetary gearing, i. e., the second reduction.

By the structure set forth in the present invention, a torque will be delivered at the wheels, for a given sized internal ring gear and a given reduction, with less tooth pressure and bearing pressure, and less wear on gear teeth and bearings, which may be seen by the following explanation. Assume a given tooth pressure P between the teeth of the driving pinion and idler gear. The same tooth pressure P will be exerted between the teeth of the idler gear and the internal ring gear, the driving ring pin acting as a fulcrum for the idler gear which, in reality, acting as a lever, will, therefore, exert a force equal to twice the tooth pressure.

It is an object of my invention to use this force as a driving force. It will be seen that though I have doubled the driving force for a given tooth pressure, I have decreased the radius at which this acts. However, this radius has not been decreased as much as the force has been increased; the amount the radius is decreased depending upon the relative size of the driving pinion and the ring gear; in other words, on the gear ratio. Assuming that a given torque is to be delivered by this reduction, the total tangential tooth pressure neglecting friction in my invention will be expressed by the following formula: $\frac{2(R-1)T}{RD_g}$, where T equals torque in inch pounds delivered at the reduced speed, $D_g$ equals diameter of internal ring gear, and R equals gear reduction (not including bevel reduction) obtained in mechanism. In the type where the idler gears are fixed and the internal gear rotates, or the conventional internal gear drive, the total tangential tooth pressure, again neglecting friction, will be expressed by the following formula: $\frac{2T}{D_g}$. It may be seen that for a given torque, and neglecting friction, the ratio of the tooth pressure brought about by the use of my invention to the tooth pressure brought about by the use of the two types referred to above, may be expressed by the ratio $\frac{R-1}{R}$. Furthermore, to obtain the same gear reduction, my invention allows the use of a larger driving pinion with a given sized internal ring gear, this due to the effect of the planetary rotation of the idler gears. Therefore, each tooth in the pinion of my invention is not used as often for each revolution of the wheel, thus cutting down the wear on the teeth. This, combined with the smaller tooth pressure obtained for the given torque, reduces the wear greatly. If wear is expressed as the product of a constant, C, (depending in value on the material used) times pressure times number of times used, and assuming the same material, width, size and type of teeth in each case, the ratio of the wear of the pinion teeth used in my invention to the wear of the pinion teeth used in the two types above mentioned, may be expressed by the ratio $\frac{(R-1)^2}{R^2}$.

It will thus be seen that by the use of my invention for a given sized internal ring gear and a given reduction, the same torque will be delivered to the wheels, but this same torque will cause less gear and bearing wear in my device than in other types, thereby increasing the life of the assembly.

I claim:

1. A final drive for automotive vehicles comprising an axle housing having a driving mechanism carrier frame removably secured thereto, a driving mechanism comprising a speed change mechanism, a ring gear, a pinion in the plane of said ring gear and driven from said speed change mechanism, and planet gears meshing with said ring gear and pinion, said speed change mechanism, ring gear, pinion and planet gears being removable from the housing with said carrier frame as a unit.

2. A final drive for automotive vehicles comprising an axle housing having a driving mechanism carrier frame removably secured thereto, a driving mechanism comprising a speed change mechanism, a ring gear, a pinion in the plane of said ring gear and driven from said speed change mechanism, and planet gears meshing with said ring gear and pinion, an axle, said planet gears being connected to drive said axle, said speed change mechanism, ring gear, pinion and planet gears being removable from the housing with said carrier frame as a unit.

3. A final drive for automotive vehicles comprising an axle housing, a carrier frame removably secured to said housing, a rear axle, a differential mechanism and a planetary gearing operatively associated together for driving said axle, means for driving said differential mechanism and planetary gearing, said differential mechanism and planetary gearing being mounted within said carrier frame and removable therewith as a unit from said housing.

4. A final drive for automotive vehicles comprising a housing, a driving mechanism carrier frame removably secured to said housing to project therein, a differential mechanism, a drive shaft for driving said differential, an axle shaft, a planetary gearing driven from said differential, said planetary gearing being connected to drive said axle shaft, said differential, drive shaft, and planetary gearing being removable from the housing with said carrier frame as a unit.

5. A final drive for automotive vehicles comprising a housing, a driving mechanism carrier frame removably secured to said housing to project therein, a speed change mechanism, means for driving said speed change mechanism, an axle shaft having a projecting element fixed to rotate therewith, studs on said projecting element, a ring gear fixed to said frame, a spur gear inwardly spaced from and opposing said ring gear and driven from said speed change mechanism, and planetary gears journalled on said studs and meshing with said ring gear and said spur gear and driven by the latter to drive said axle shaft.

6. A final drive for automotive vehicles comprising a housing, a driving mechanism carrier frame removably secured to said housing to project therein, a speed change mechanism, means for driving said speed change mechanism, an axle shaft having a projecting element fixed to rotate therewith, studs on said projecting element, a ring gear fixed to said frame, a spur gear inwardly spaced from and opposing said ring gear and driven from said speed change mechanism, and planetary gears journalled on said studs and meshing with said ring gear and said spur gear and driven by the latter to drive said axle shaft, said speed change mechanism, said ring gear, said spur gear, and said planetary gears being removable from the housing with said carrier frame as a unit.

7. A final drive for automotive vehicles comprising a differential mechanism, planetary gearing driven therefrom, an axle shaft, a stationary ring gear meshing with the respective planet gears of said planetary gearing, the axis of simple rotation of each of said planet gears being fixed with relation to said axle shaft to rotate therewith whereby to drive the latter directly from the planet rotation of the axles of said planet gears, a housing having a carrier frame removably secured thereto, said differential, said planetary gearing and said ring gear being removable from the housing with said carrier frame as a unit.

8. A final drive for automotive vehicles comprising a housing, a differential carrier frame removably secured to said housing, and arranged to project therein, a pinion shaft, a pinion carried thereby, a differential driven by said pinion, a planetary gearing, and means disposed between said differential and said planetary gearing for driving the latter from the differential at reduced speed, said pinion, said differential, said planetary gearing and said intermediate means being removable with said differential carrier frame as a unit from the housing.

9. A final drive for automotive vehicles comprising a housing, a differential carrier frame removably secured to said housing, and arranged to project therein, a pinion shaft, a pinion carried thereby, a differential driven by said pinion, a planetary gearing, and means disposed between said differential and said planetary gearing for driving the latter from the differential at reduced speed, said pinion, said differential, said planetary gearing and said intermediate means being removable with said differential carrier frame as a unit from the housing, and an axle shaft removably associated with said planetary gearing and adapted to be driven thereby.

10. A final drive insertible into and removable from an axle housing as a unit, comprising a first speed reduction, a differential mechanism actuated by said first speed reduction, a second speed reduction comprising a train of gears having a driving gear coaxial with the driven gear of the first speed reduction and intermediate gears arranged to balance the driving force reaction on said second reduction driving gear.

LOUIS C. HUCK.